No. 12,629. REISSUED APR. 9, 1907.

C. E. BERTELS.

COVER FASTENER FOR CANS.

APPLICATION FILED NOV. 12, 1906.

Charles E. Bertels,

INVENTOR.

WITNESSES:

E. J. Stewart

Jno. E. Parker

By C. A. Snow & Co.

ATTORNEYS

UNITED STATES PATENT OFFICE.

CHARLES E. BERTELS, OF WILKES-BARRE, PENNSYLVANIA, ASSIGNOR TO WYOMING VALLEY TRUST COMPANY, TRUSTEE, OF WILKES-BARRE, PENNSYLVANIA.

COVER-FASTENER FOR CANS.

No. 12,629. Specification of Reissued Letters Patent. Reissued April 9, 1907.

Original No. 802,677, dated October 24, 1905. Application for reissue filed November 12, 1906. Serial No. 343,164.

*To all whom it may concern:*

Be it known that I, CHARLES E. BERTELS, a citizen of the United States, residing at Wilkes-Barre, in the county of Luzerne and State of Pennsylvania, have invented a new and useful Cover-Fastener for Cans, of which the following is a specification.

This invention relates to cover-fasteners for cans.

The object of the invention is to dispense with the employment of screw-threads, hinges, and hasps, and staples, and other equivalent forms of fastening devices for holding a cover upon a can, and in lieu thereof to provide a simple and thoroughly efficient form of fastening device which may be readily applied to the cover and which by interlocking with the edge or rim portion of the can will be positive in holding the cover and can assembled; furthermore, to obviate the formation of obstructions or extended parts in the fastening device, whereby damage thereto will be positively prevented.

With the above and other objects in view, as will appear as the nature of the invention is better understood, the same consists in the novel construction and combination of parts of a fastener for cans, as will be hereinafter fully described and claimed.

Figure 1:
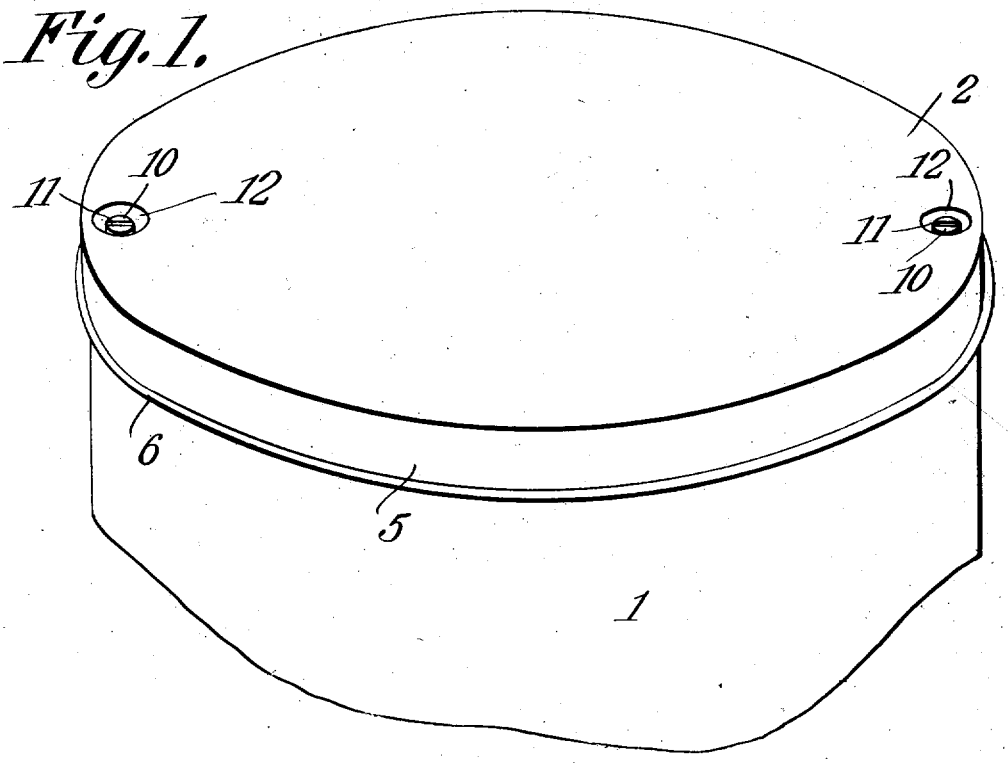
Figure 2:
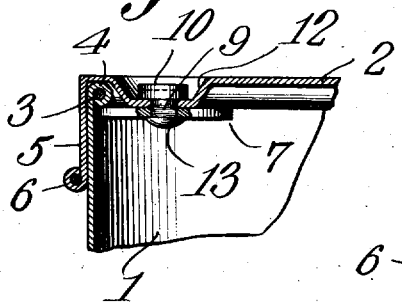
Figure 3:
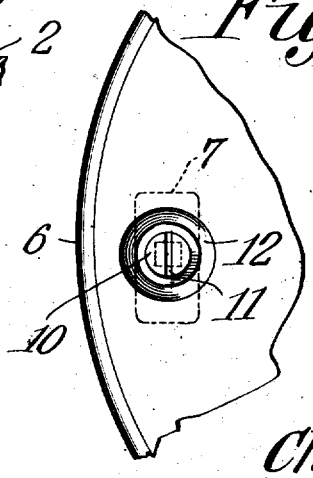
Figure 4:
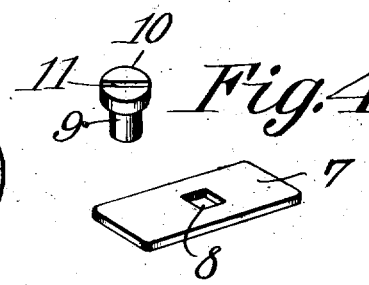

In the accompanying drawings, forming a part of this specification, and in which like characters of reference indicate corresponding parts, Figure 1 is a view in perspective of a portion of the upper part of a can, exhibiting a cover combined therewith and held by the fastening device of the present invention. Fig. 2 is a sectional detail view taken through the cover and a portion of the can, showing the manner in which the fastening device cooperates with the edge of the can to hold the parts assembled. Fig. 3 is a fragmentary detail view in plan, exhibiting more particularly the manner in which the position occupied by the locking device may be determined. Fig. 4 is a collective view in perspective, exhibiting the parts of the locking device.

The present invention is described as used in connection with a metallic can, such as employed in the shipping of lard; but it will be obvious that the locking device will be adaptable for use in connection with cans or receptacles for holding other materials and also cans constructed on other lines than that shown, and as this will be readily apparent detailed illustration of any modified form of the invention is omitted.

Referring to the drawings, 1 designates the can, and 2 the cover. The can is provided with a bead 3, disposed on the interior of the can in order to be in position to be engaged by the locking device, presently to be described. As herein shown, the bead is provided with a reinforcing-wire 4, and this will generally be employed; but it is to be understood that the invention is not to be limited to this precise arrangement, as the wire may be omitted and the metal of the can folded or rolled upon itself to form a bead or rim, which will meet all requirements of the case.

The cover 2 has its rim 5 provided in this instance with reinforced or beaded edge 6; but this latter part may be omitted from the cover without detracting from the merits of the invention or departing from the scope thereof.

The locking device consists of a button 7, made of a strip of metal approximately rectangular in shape and provided with a square opening 8 intermediate of its ends to be engaged by the shank of a rivet 9, which forms the other element of the locking device, the said rivet having a head 10, provided with a nick 11, which not only serves as a means to permit of the button being turned, but also indicates the direction in which the button is disposed relatively to the rim, as indicated by dotted lines in Fig. 3, it being seen that the nick will be disposed longitudinally of the button, and when the button is turned so that the nick will be in approximate parallelism with the rim of the cover, as shown in Fig. 3, the operator will know that the button is out of engagement with the bead 4, and when the nick is disposed at right angles to the rim he will know that the button is in engagement with the bead. In this instance there are but two of the locking devices shown; but, as will be apparent, a greater number may be employed, if found necessary or desirable.

In order to prevent the heads of the rivets from forming obstructions extending above the plane of the cover, which would be objectionable for the reason that they would interfere with the proper application of a label thereto and, further, would prevent the piling of the cans one on the other without denting the bottoms or possibly damaging the locking devices, the cover is provided with two alined bosses or depressions 12, formed by stamping up the metal of the cover, the bosses being extended beyond the cover a distance substantially equal to the diameter of the bead 3, so that when the buttons are combined with the bosses they will be approximately in alinement with the under edge of the bead, but not exactly so, as it is designed that there shall be sufficient frictional resistance between the button and the bead to prevent the former from accidentally working loose.

It will be noted that the shank of the rivet is circular, and when this is inserted through the orifice of the button and upset, as shown at 13, the metal will fill the entire area of the orifice, and thereby secure an effective juncture between the parts.

It will be seen from the foregoing description that although the improvements of this invention are simple in character they will be thoroughly efficient for the purposes designed and that their adoption will not necessitate any objectionable change in the structural arrangement of the cover or add such cost thereto as would detract from the selling qualities of the can.

I claim—

1. The combination with a receptacle having a wired edge disposed on the inner side thereof, of a cover having inward-projecting bosses, fastening devices embodying buttons adapted to interlock with the edge, and rivets rigidly connected with the buttons and having nicked heads disposed within the bosses, the nicks being arranged lengthwise of the buttons.

2. The combination with a receptacle having an inturned rolled edge, of a cover, cover-fastening devices including buttons adapted to interlock with said inturned edge, and button-carrying members having nicked operating-heads shaped to indicate the positions of the buttons and bearing a definite relation thereto.

3. The combination with a receptacle having an inturned edge, of a flat cover stamped to form inward-projecting bosses, fastening devices embodying buttons adapted to interlock with the inturned edge, and button-carrying members having tool-engaging heads disposed within the bosses and shaped to indicate the positions of the buttons.

4. The combination with a receptacle having an inturned edge, of a flat cover having inward-extending bosses and fastening devices embodying buttons adapted to lock with the inturned edge, and button-carrying members having operating-heads located wholly within said recesses.

In testimony that I claim the foregoing as my own I have hereto affixed my signature in the presence of two witnesses.

CHARLES E. BERTELS.

Witnesses:
JENNIE RICHARDS,
MAE MCNALLY.